(12) United States Patent
Shaikh et al.

(10) Patent No.: US 9,856,918 B2
(45) Date of Patent: Jan. 2, 2018

(54) BEARING AND HOUSING SUPPORT FOR INTERMEDIATE DRIVE SHAFT

(71) Applicant: Schaeffler Technologies AG & Co. KG, Herzogenaurach (DE)

(72) Inventors: Shakeel Shaikh, Windsor (CA); Bogyu Kang, Rochester, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/147,232

(22) Filed: May 5, 2016

(65) Prior Publication Data

US 2016/0348727 A1 Dec. 1, 2016

Related U.S. Application Data

(60) Provisional application No. 62/168,419, filed on May 29, 2015.

(51) Int. Cl.
*F16C 27/00* (2006.01)
*F16C 35/04* (2006.01)
*F16C 35/067* (2006.01)
*F16C 19/06* (2006.01)

(52) U.S. Cl.
CPC .......... *F16C 35/042* (2013.01); *F16C 35/067* (2013.01); *F16C 19/06* (2013.01); *F16C 2208/20* (2013.01); *F16C 2220/06* (2013.01); *F16C 2226/30* (2013.01); *F16C 2326/06* (2013.01)

(58) Field of Classification Search
CPC ...... F16C 35/042; F16C 35/067; F16C 35/07; F16C 35/073; F16C 2208/20; F16C 2220/06; F16C 2226/30; F16C 2326/06; B60B 35/006
See application file for complete search history.

(56) References Cited

U.S. PATENT DOCUMENTS

| | | | |
|---|---|---|---|
| 3,845,336 A * | 10/1974 | Moores, Jr. ........... | F16C 35/067 310/50 |
| 8,091,240 B2 * | 1/2012 | Katougi ................ | F16C 33/586 29/505 |
| 8,141,248 B2 * | 3/2012 | de Andrade Filho . | F16C 35/067 29/888 |
| 8,258,659 B2 * | 9/2012 | Debrailly .............. | F16C 35/067 310/68 B |
| 2002/0130570 A1 * | 9/2002 | Howe ................... | F16C 35/067 310/89 |
| 2009/0214145 A1 | 8/2009 | Cislo et al. | |

FOREIGN PATENT DOCUMENTS

WO 2015067265 A1 5/2015

* cited by examiner

*Primary Examiner* — James Pilkington
(74) *Attorney, Agent, or Firm* — Antun M. Peakovic

(57) ABSTRACT

A bearing and housing support including a bearing outer ring overmolded with a thermoplastic bearing housing. The support arranged to support and engage with an intermediate drive shaft of a vehicle.

5 Claims, 6 Drawing Sheets

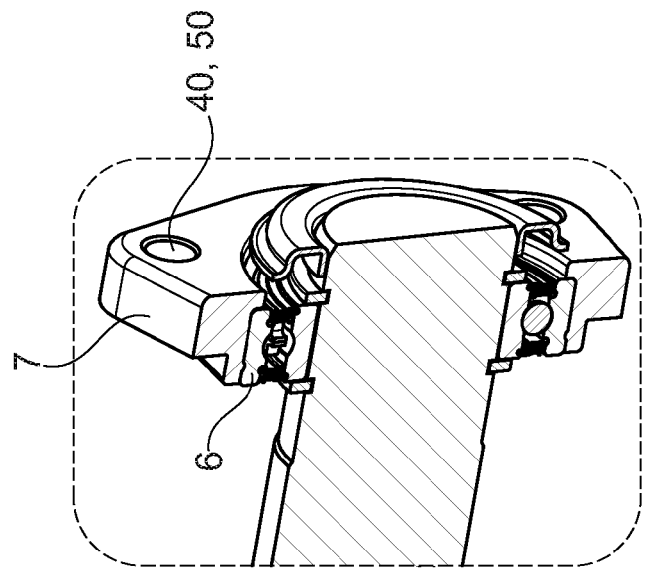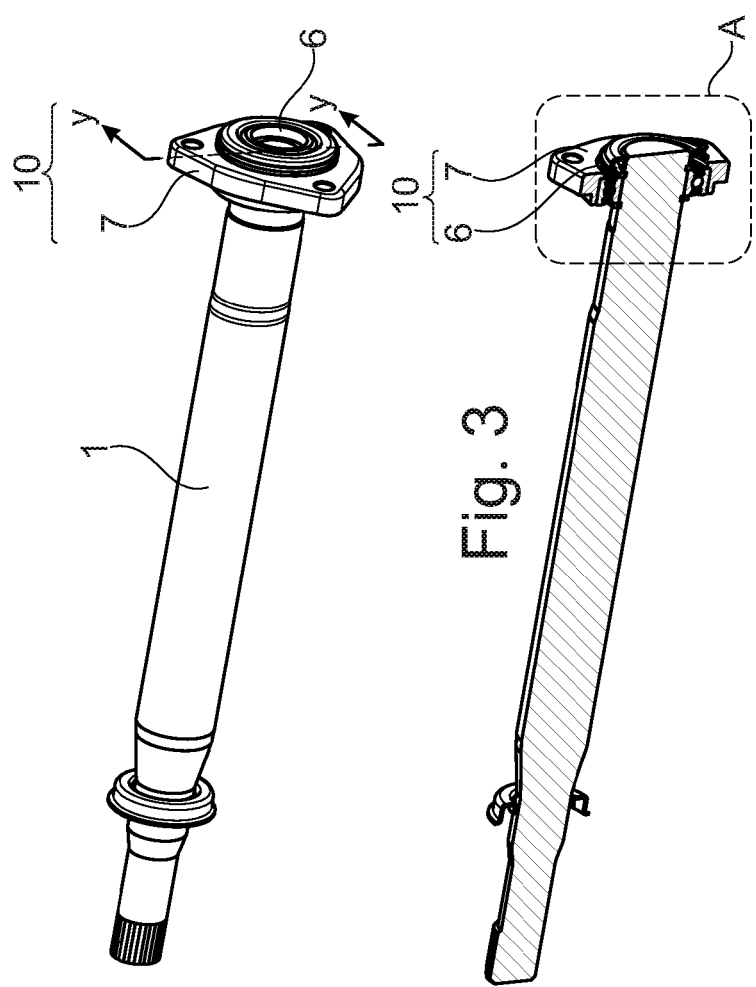

BEARING AND HOUSING SUPPORT FOR INTERMEDIATE DRIVE SHAFT

TECHNICAL FIELD

The present disclosure relates to a bearing and overmolded thermoplastic housing arranged to engage and support an intermediate drive shaft of a vehicle.

BACKGROUND

Intermediate drive shafts on vehicles require bearing support at the connection point to a half shaft. This support has relatively small load support requirements.

BRIEF SUMMARY OF THE INVENTION

According to one aspect of the present disclosure, a bearing and housing support arrangement are provided, including a bearing having an outer and inner ring, and a thermoplastic housing connected to the outer ring.

According to a further aspect of the present disclosure, two or more metal mounts are each inserted into complementary mounting perforations in the thermoplastic bearing housing, with a retention tab extending from an axial face of the thermoplastic bearing housing adjacent the mounting perforation and extending axially and radially to seat against an axial face of the metal mount and retain the metal mount against the axial face of the thermoplastic bearing housing.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 3 is a rear perspective view of the intermediate drive shaft with a bearing and housing support assembly of FIG. 2;

FIG. 4 is a cross-sectional perspective view of the intermediate drive shaft with bearing and housing support taken along line Y-Y of FIG. 3;

FIG. 5 is an enlarged view of portion A of FIG. 4;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
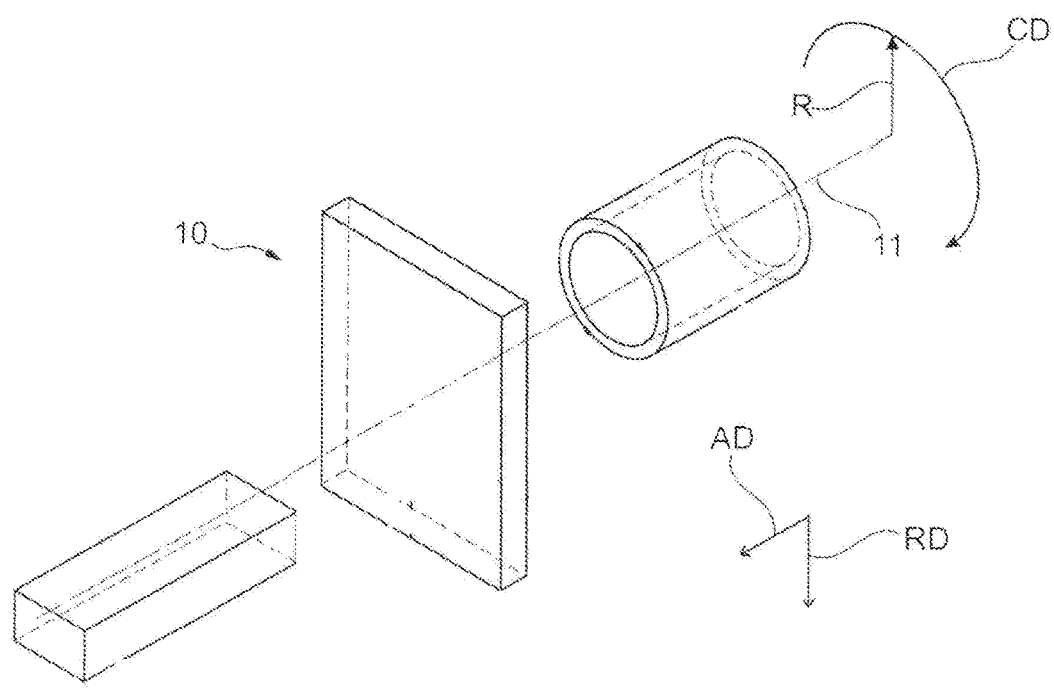
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

Figure 2:
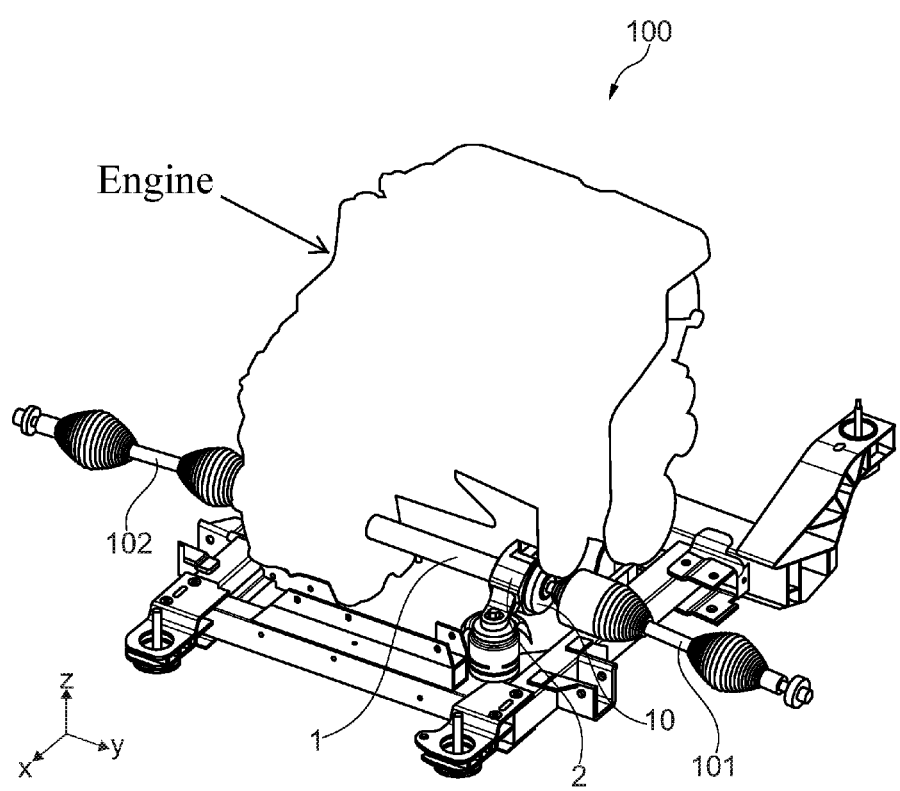
FIG. 2 is a perspective view of a an engine and transmission system including an intermediate drive shaft with a bearing and housing support assembly according to one example embodiment.
Figure 6:
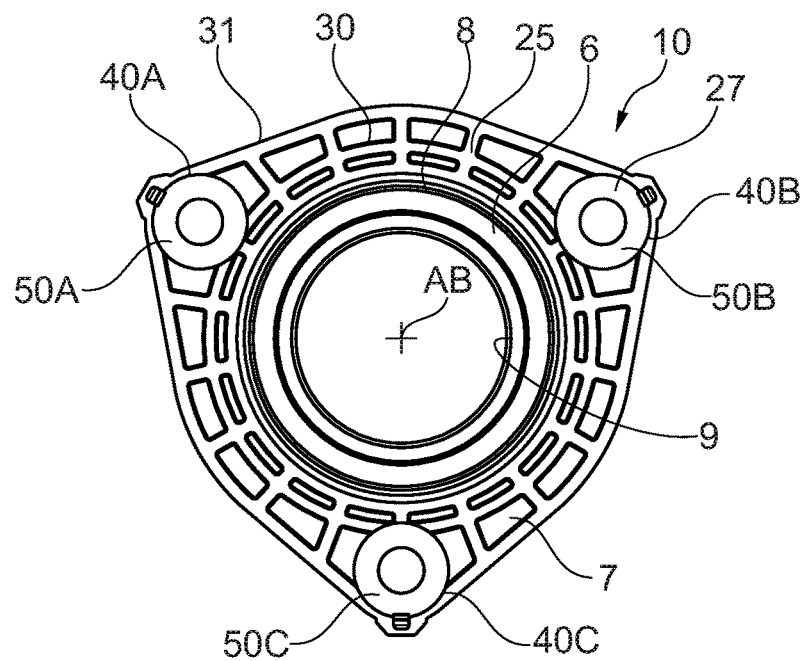
FIG. 6 is a front view of the bearing and housing assembly, according to one example embodiment.
Figure 7:
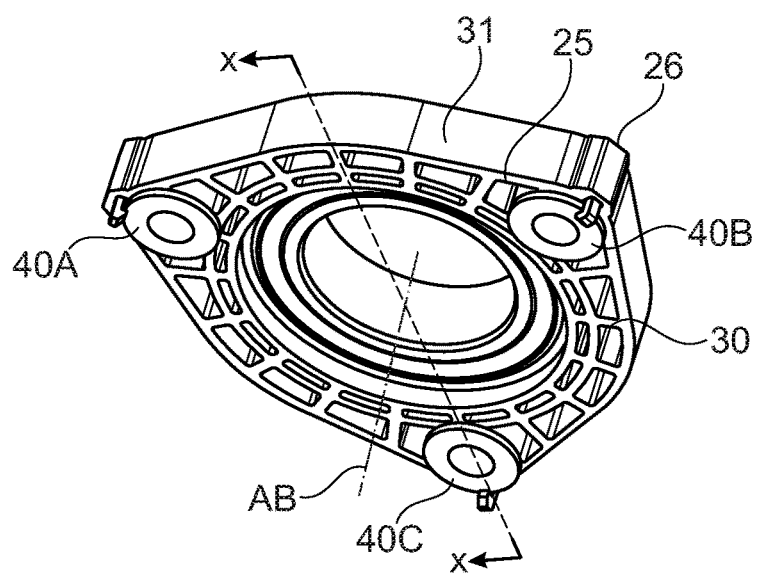
FIG. 7 is a perspective view of the bearing and housing support of FIG. 6.
Figure 9:
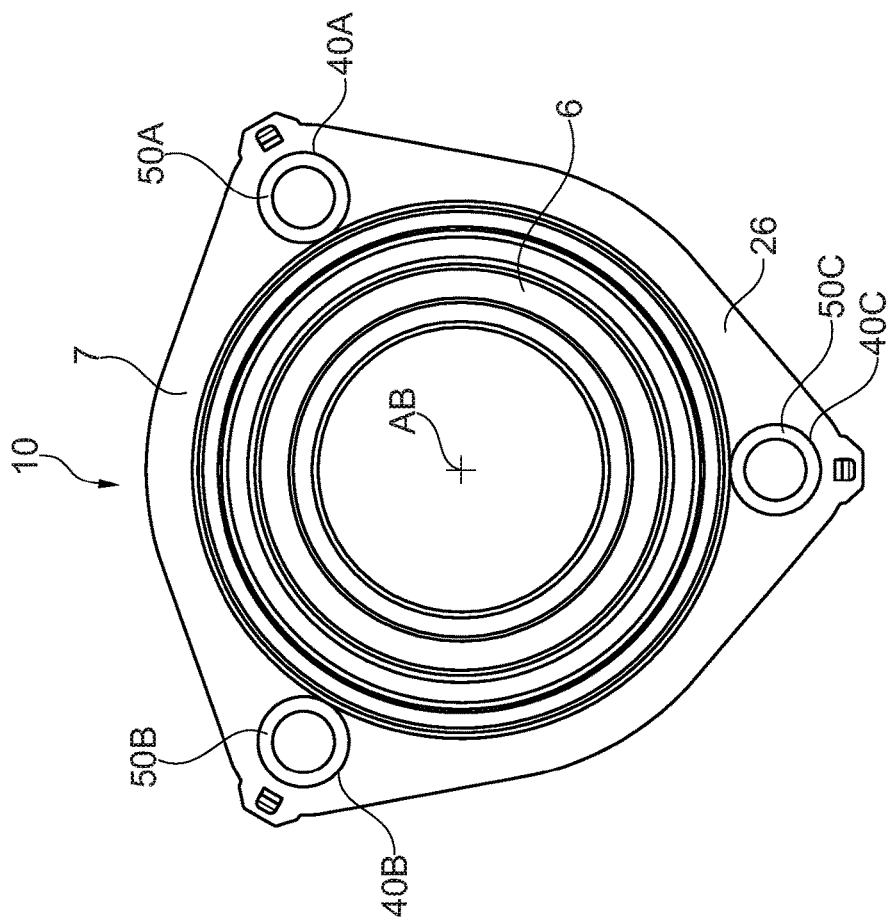
FIG. 9 is a rear view of the bearing and housing support of FIG. 6.
Figure 8:
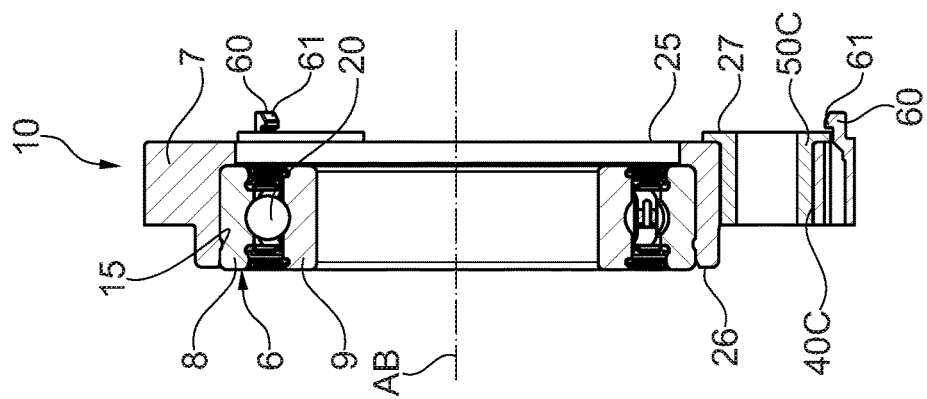
FIG. 8 is a cross sectional view of the bearing and housing support, taken along line X-X of FIG. 7.
Figure 10:
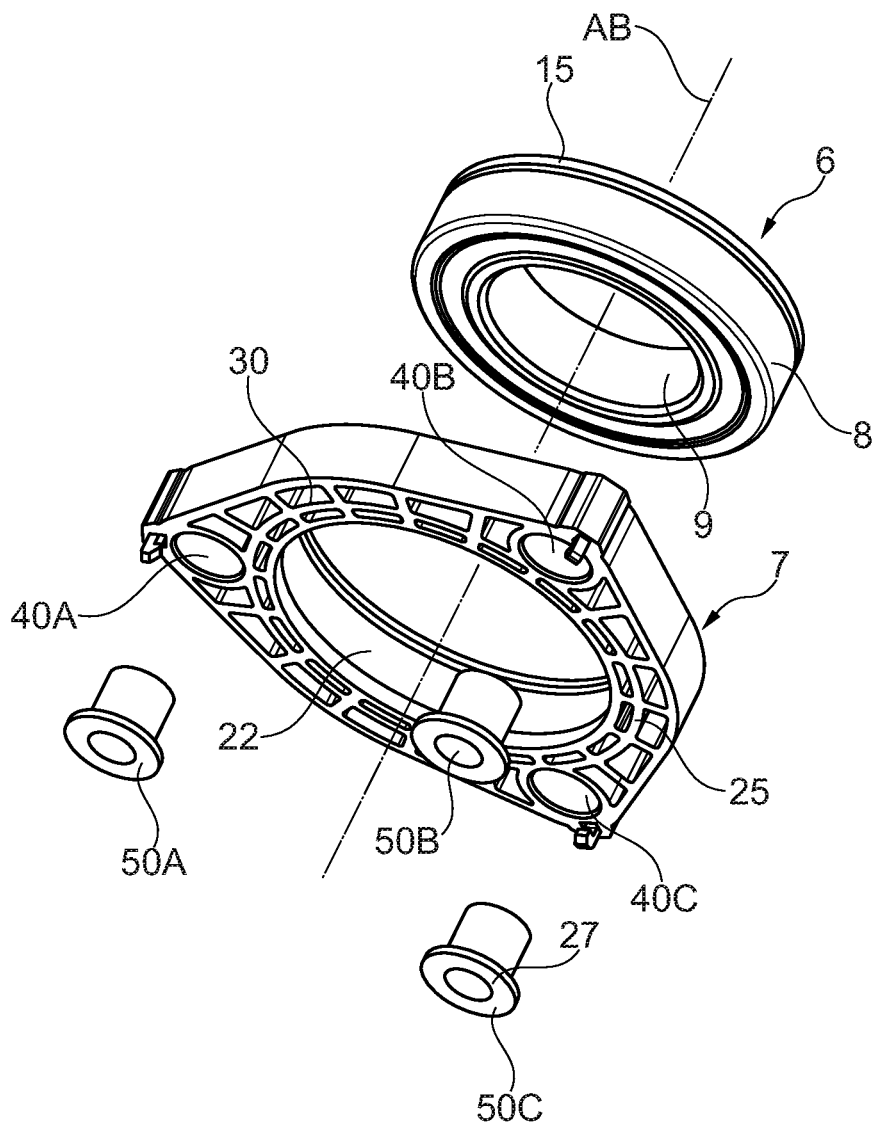
FIG. 10 is an exploded view of the components of the bearing and housing support of FIG. 6.

FIG. 2 is a perspective view of a an engine and transmission system 100 including intermediate drive shaft 1 with bearing and housing support 10 according to one example embodiment. FIG. 3 is a rear perspective view of intermediate drive shaft 1 with bearing and housing support 5 of FIG. 2. FIG. 4 is a cross-sectional perspective view of intermediate drive shaft 1 with bearing and housing support 10 taken along line Y-Y of FIG. 3. FIG. 5 is an enlarged view of portion A of FIG. 4. FIG. 6 is a front view of bearing and housing support 10 with axis AB, according to one example embodiment. FIG. 7 is a perspective view of bearing and housing support 10 of FIG. 6. FIG. 8 is a cross sectional view of bearing and housing support 10, taken along line X-X of FIG. 7. FIG. 9 is a rear view of bearing and housing support 10 of FIG. 6. FIG. 10 is an exploded view of the components of bearing and housing support 10 of FIG. 6. The following description should be viewed in light of FIGS. 1 to 10.

Intermediate shaft 1 is used to connect two half shafts 101 and 102, respectively. At the connection of half shaft 101 to intermediate shaft 1, a support is needed to align the two shafts. Bearing 6 connects to an outer cylindrical surface of intermediate shaft 1, for example, by press fitting, and housing 7 connects to a support bracket assembly 2 and to half shaft 101 using securing fasteners.

Bearing 6 includes outer ring 8, inner ring 9 and rolling elements 20 disposed between outer ring 8 and inner ring 9. In one example embodiment a thermoplastic is molded directly onto outer ring 8, in a size and form depending on a particular application. The thermoplastic is formed into housing 7. Outer ring 8 can include retention feature 15, including a groove or tab or other retention feature known in the art. A groove in outer radial surface 70 of outer ring 8 is shown in the present embodiment, the groove having a depth and extending around at least a portion of outer radial surface 70. As thermoplastic is molded over outer ring 8, at least a portion of the thermoplastic flows into the retention feature, and once the material hardens, axially retains the housing with respect to the bearing outer ring 8. In the example embodiment shown, housing 7 has a generally triangular or tri-lobed form, having a ribbed support structure 30 extending from an inner cylindrical surface 22 adjacent bearing outer ring 8 to an outer radial surface 31. Ribbed support structure 30 provides strengthening and rigidity to bearing and housing support 10. At least one mounting perforation 40 is molded into housing 7. In this example embodiment, in particular due to the triangular or tri-lobed form, there are three mounting perforations 40A, 40B and 40C. A metal mount 50 is inserted into each of perforations 40. Metal mounts 50 may be press fit into perforations 40. In this example embodiment, in particular due to the triangular or tri-lobed form, there are three metal mounts 50A, 50B and 50C. In the example embodiment shown retention tab 60 is integrally molded into housing 7 and extends axially from axial face 25 and has radial extension 61 that seats against axial face 27 of metal mount 50 and retains metal mount 50 against axial face 25.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A bearing and housing support, comprising:
   a bearing having:
      an outer ring;
      an inner ring arranged to connect to an intermediate drive shaft of a vehicle; and
      rolling elements disposed between the inner and outer rings; and
   a thermoplastic bearing housing connected to the outer ring and arranged to connect to a support bracket of a vehicle, having:
      at least one metal mount inserted into a complementary mounting perforation in the thermoplastic bearing housing; and
      a retention tab extending from an axial face of the thermoplastic bearing housing adjacent the complementary mounting perforation and extending axially and radially to seat against an axial face the at least one metal mount and retain the at least one metal mount against the axial face of the thermoplastic bearing housing.

2. The bearing and housing support of claim 1, wherein the thermoplastic bearing housing has a ribbed support structure.

3. The bearing and housing support of claim 2, wherein the ribbed support structure extends from an inner diameter cylindrical surface adjacent the bearing to an outer radial surface of the thermoplastic bearing housing.

4. The bearing and housing support of claim 1, further comprising a retention feature on an outer cylindrical surface of the outer ring arranged to engage and axially retain the thermoplastic bearing housing.

5. The bearing and housing support of claim 4, wherein the retention feature is an annular groove arranged to receive overmolded thermoplastic from the thermoplastic bearing housing.

* * * * *